(12) United States Patent
Ogasawara

(10) Patent No.: US 9,091,308 B2
(45) Date of Patent: Jul. 28, 2015

(54) POWER UNIT FOR VEHICLE

(75) Inventor: Atsushi Ogasawara, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 1242 days.

(21) Appl. No.: 11/976,562

(22) Filed: Oct. 25, 2007

(65) Prior Publication Data

US 2008/0099305 A1 May 1, 2008

(30) Foreign Application Priority Data

Oct. 30, 2006 (JP) ................. 2006-294646

(51) Int. Cl.
*F16D 25/10* (2006.01)
*F16D 25/0638* (2006.01)

(52) U.S. Cl.
CPC ............ *F16D 25/10* (2013.01); *F16D 25/0638* (2013.01)

(58) Field of Classification Search
USPC ........................................................ 192/3.58
See application file for complete search history.

(56) References Cited

U.S. PATENT DOCUMENTS

| | | | | |
|---|---|---|---|---|
| 3,626,861 A | * | 12/1971 | Black et al. | 105/130 |
| 6,269,927 B1 | * | 8/2001 | Kanenobu et al. | 192/48.601 |
| 7,673,712 B2 | * | 3/2010 | Iida et al. | 180/53.1 |
| 8,360,218 B2 | * | 1/2013 | Fujimoto et al. | 192/48.611 |
| 2003/0131684 A1 | * | 7/2003 | Hori et al. | 74/606 R |
| 2005/0217915 A1 | * | 10/2005 | Kosugi et al. | 180/219 |
| 2006/0191766 A1 | * | 8/2006 | Konukiyo et al. | 192/86 |
| 2007/0199755 A1 | * | 8/2007 | Takeuchi | 180/221 |

FOREIGN PATENT DOCUMENTS

| | | |
|---|---|---|
| JP | 7-285482 A | 10/1995 |
| JP | 11-222043 A | 8/1999 |
| JP | 2003-320861 A | 11/2003 |
| JP | 2006-143177 A | 6/2006 |

* cited by examiner

*Primary Examiner* — Robert Hodge
*Assistant Examiner* — Ryan Dodd
(74) *Attorney, Agent, or Firm* — Birch, Stewart, Kolasch & Birch, LLP

(57) ABSTRACT

A power unit for a vehicle can avoid an increase in the longitudinal size of an engine body and a vehicle body due to the provision of a clutch actuator. Clutches for switching between the connection and disconnection of the transmission of power are provided in a power transmission path for transmitting a rotational drive force of a crankshaft to a drive wheel. A clutch cover is joined to a side portion of a crankcase. A clutch chamber for accommodating the clutches is formed between the crankcase and the clutch cover. A clutch actuator for controlling the switching between an engaged condition and disengaged condition of the clutches is mounted on an engine body. The clutch actuator is provided on an upper portion of the clutch cover.

12 Claims, 7 Drawing Sheets

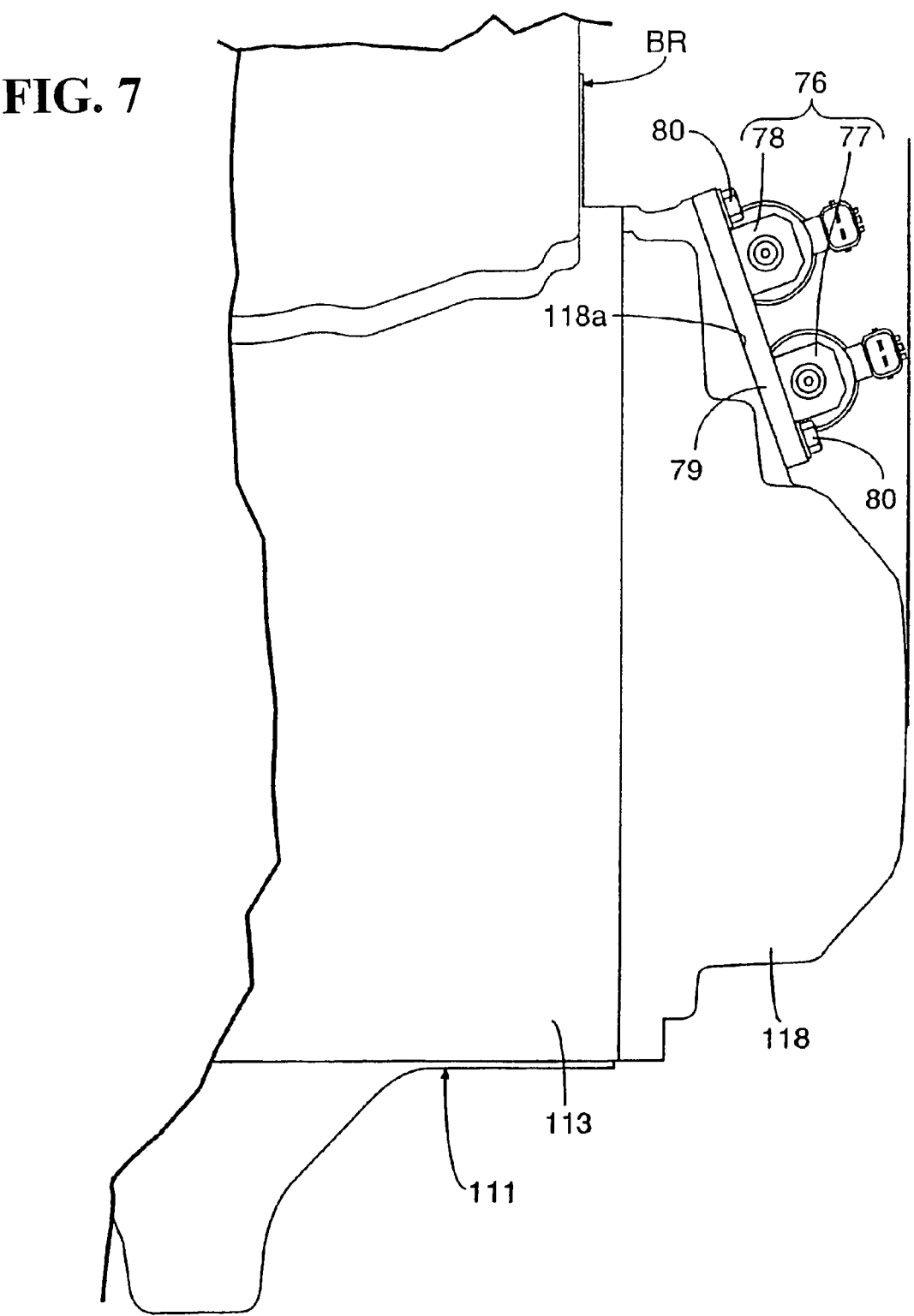

POWER UNIT FOR VEHICLE

CROSS-REFERENCE TO RELATED APPLICATIONS

This nonprovisional application claims priority under 35 U.S.C. §119(a) on Patent Application No. 2006-294646, filed in Japan on Oct. 30, 2006, the entirety of which is incorporated herein by reference.

BACKGROUND OF THE INVENTION

1. Field of the Invention

The present invention relates to a power unit for a vehicle having a crankcase, a crankshaft rotatably supported to the crankcase, a power transmission path for transmitting a rotational drive force of the crankshaft to a drive wheel, a clutch provided in the power transmission path for switching between the connection and disconnection of the transmission of power, and a clutch actuator mounted on an engine body for controlling the switching between an engaged condition and disengaged condition of the clutch.

2. Background of the Invention

Such a power unit for a vehicle is known from Japanese Patent Laid-Open No. Hei 11-222043, for example. In the power unit disclosed in Japanese Patent Laid-Open No. Hei 11-222043, a clutch actuator is provided on a rearmost portion of an engine body, so that the longitudinal size of the engine body tends to be increased, and therefore the longitudinal size of a vehicle body tends to be increased.

SUMMARY OF THE INVENTION

It is accordingly an object of the present invention to provide a power unit for a vehicle that can avoid an increase in the longitudinal size of an engine body and a vehicle body, due to the provision of a clutch actuator.

In accordance with the a first aspect of the present invention, there is provided a power unit for a vehicle having a crankcase, a crankshaft rotatably supported to the crankcase, a power transmission path for transmitting a rotational drive force of the crankshaft to a drive wheel, a clutch provided in the power transmission path for switching between the connection and disconnection of the transmission of power, a clutch cover joined to a side portion of the crankcase, a clutch chamber formed between the crankcase and the clutch cover for accommodating the clutch, an engine body including the crankcase and the clutch cover, and a clutch actuator mounted on the engine body for controlling the switching between an engaged condition and disengaged condition of the clutch, wherein the clutch actuator is provided on an upper portion of the clutch cover.

In accordance with a second aspect of the present invention, the engine body further includes a cylinder block joined to the crankcase, and the clutch actuator is located so that at least a part of the clutch actuator overlaps the cylinder block as viewed in side elevation of the vehicle.

In accordance with a third aspect of the present invention, the clutch actuator is positioned inside of the laterally outermost end of the clutch cover.

In accordance with a fourth aspect of the present invention, the outer surface of the upper portion of the clutch cover has a mounting seat for mounting the clutch actuator, the mounting seat being inclined laterally inward to the upper side, so that the clutch actuator is inclined laterally inward to the upper side along the upper portion of the clutch cover.

In accordance with a fifth aspect of the present invention, the crankcase is composed of an upper case half and a lower case half joined to each other, and the clutch cover is composed of an upper cover half integral with the upper case half and a lower cover half integral with the lower case half, the upper cover half and the lower cover half being joined to each other to form the clutch cover by joining the upper case half and the lower case half.

In accordance with a sixth aspect of the present invention, the clutch actuator mounted on the upper portion of the clutch cover controls the oil pressure applied to the clutch for switching between the connection and disconnection of the transmission of power according to the application and cancellation of hydraulic pressure, and the clutch cover is formed with an oil passage constituting at least a part of a hydraulic path for connecting the clutch actuator and the clutch.

According to the first aspect of the present invention, the clutch cover is joined to the side portion of the crankcase to define the clutch chamber for accommodating the clutch between the crankcase and the clutch cover, and the clutch actuator is provided on the upper portion of the clutch cover. Accordingly, the clutch actuator can be located by effectively utilizing the space above the clutch cover as avoiding an increase in longitudinal size of the engine body and the vehicle body. Furthermore, the distance between the clutch and the clutch actuator is short, so that the path for transmitting a control force from the clutch actuator to the clutch can be made compact. Furthermore, the clutch actuator can readily receive a running wind during running of the vehicle, so that the cooling effect for the clutch actuator can be improved.

According to the second aspect of the present invention, at least a part of the clutch actuator is located on one lateral side of the cylinder block. Accordingly, the clutch actuator can more readily receive a running wind, so that the cooling effect for the clutch actuator can be more improved.

According to the third aspect of the present invention, the projection of the clutch actuator from the engine body in the lateral direction can be avoided to thereby prevent an increase in lateral size of the engine.

According to the fourth aspect of the present invention, the projection of the clutch actuator from the clutch cover can be suppressed to thereby contribute to a reduction in overall size of the engine.

According to the fifth aspect of the present invention as, the clutch cover is integral with the crankcase. That is, no separate clutch cover is required, so that the number of parts can be reduced.

According to the sixth aspect of the present invention, a mechanism for operating the clutch can be configured compactly in the vicinity of the clutch cover, and the maintainability of this mechanism can be improved owing to such a compact configuration.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a view taken in the direction shown by an arrow 7 in FIG. 6.

DETAILED DESCRIPTION OF THE PREFERRED EMBODIMENTS

Figure 1:
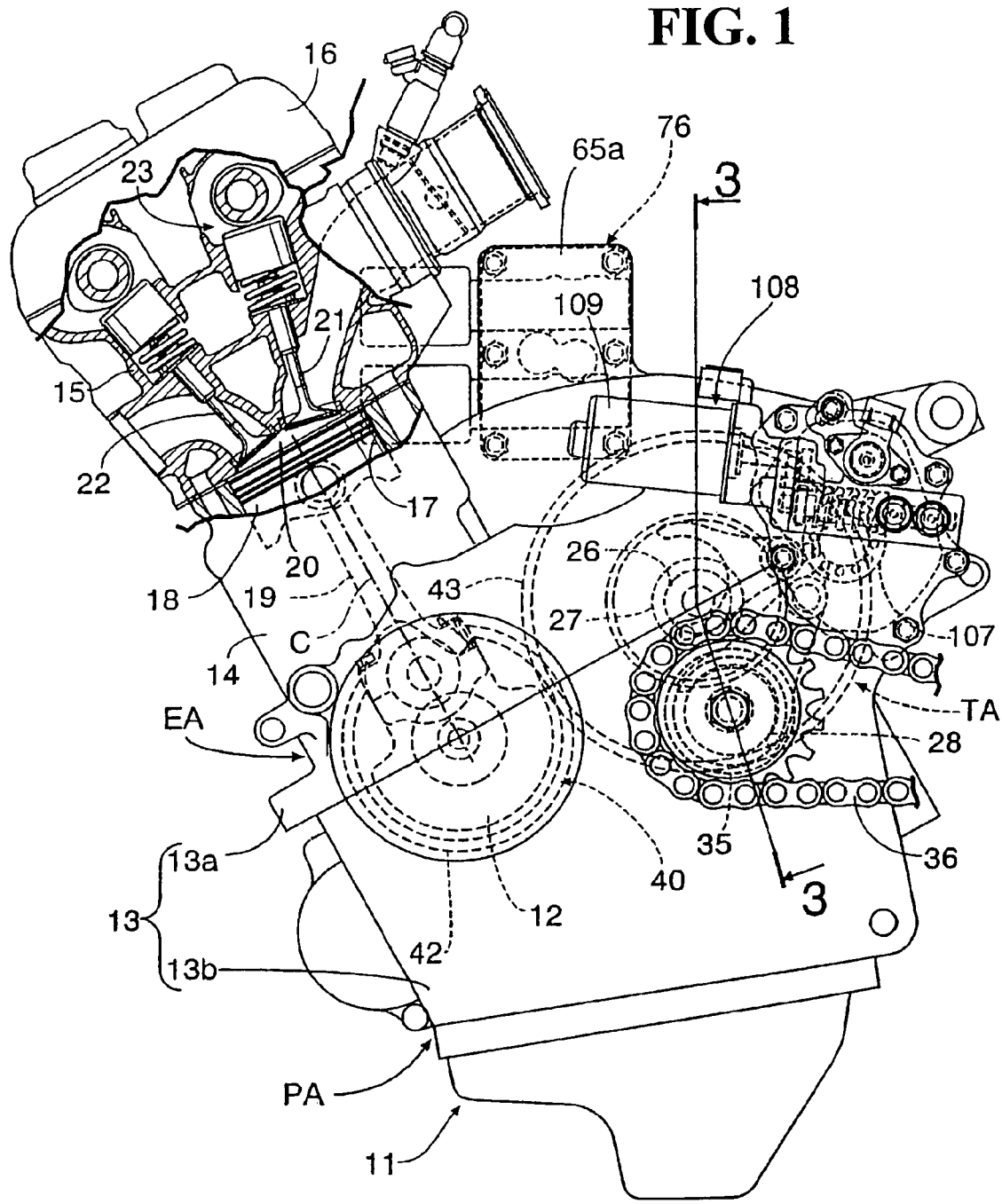
FIG. 1 is a partially cutaway, left side view of a power unit according to a first preferred embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
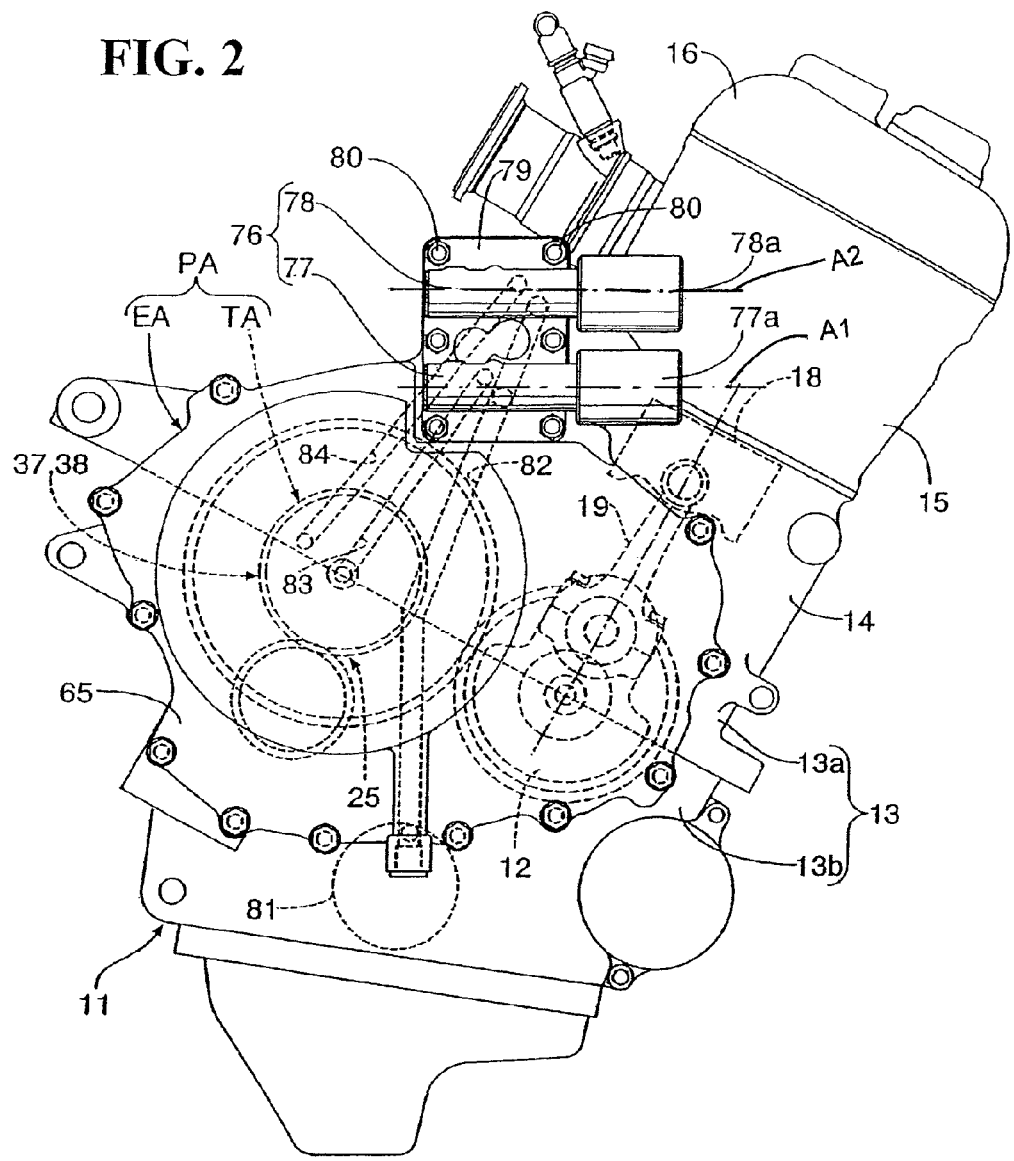
FIG. 2 is a right side view of the power unit shown in FIG. 1.
Figure 3:
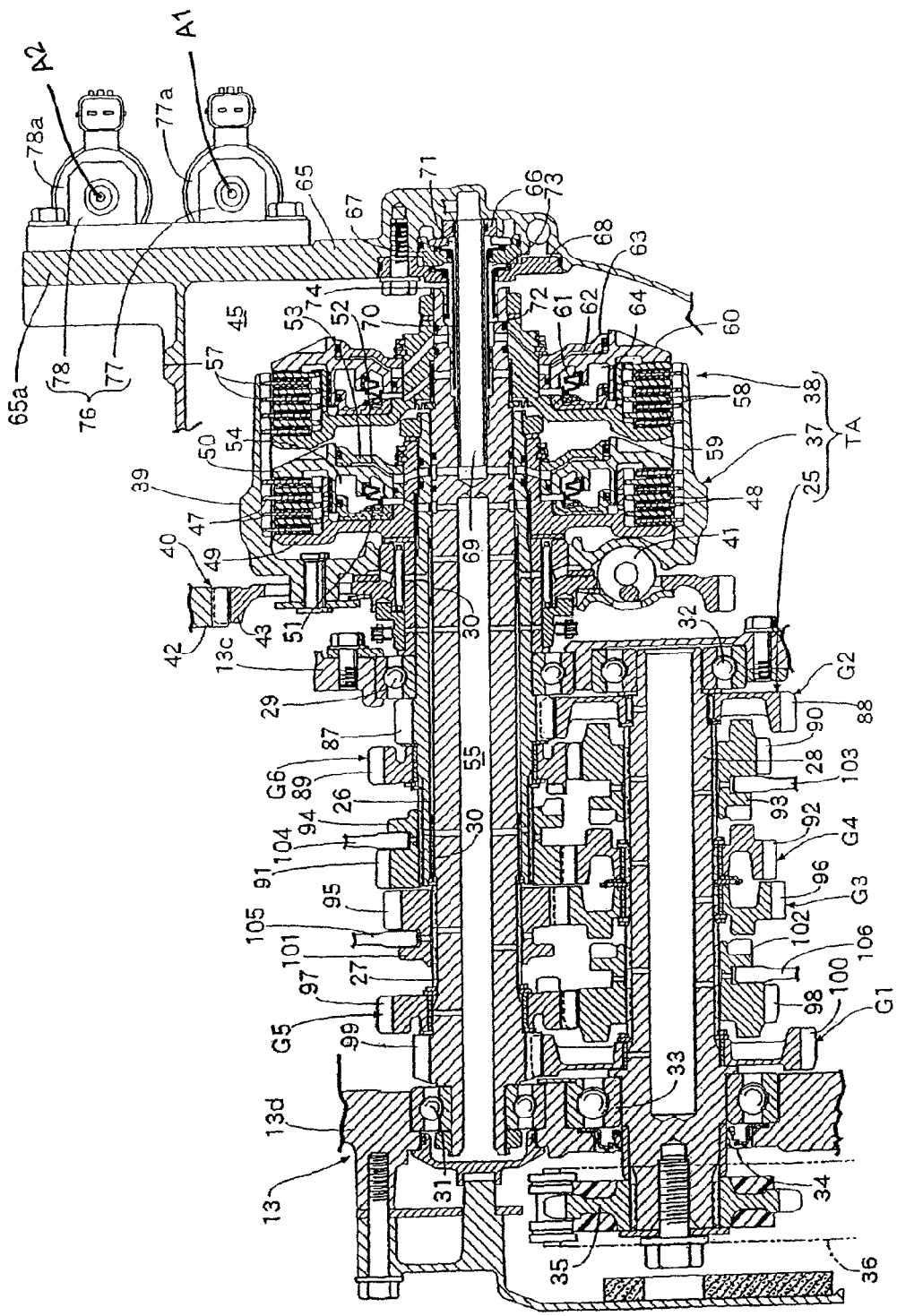
FIG. 3 is a cross section taken along the line 3-3 in FIG. 1.
Figure 4:
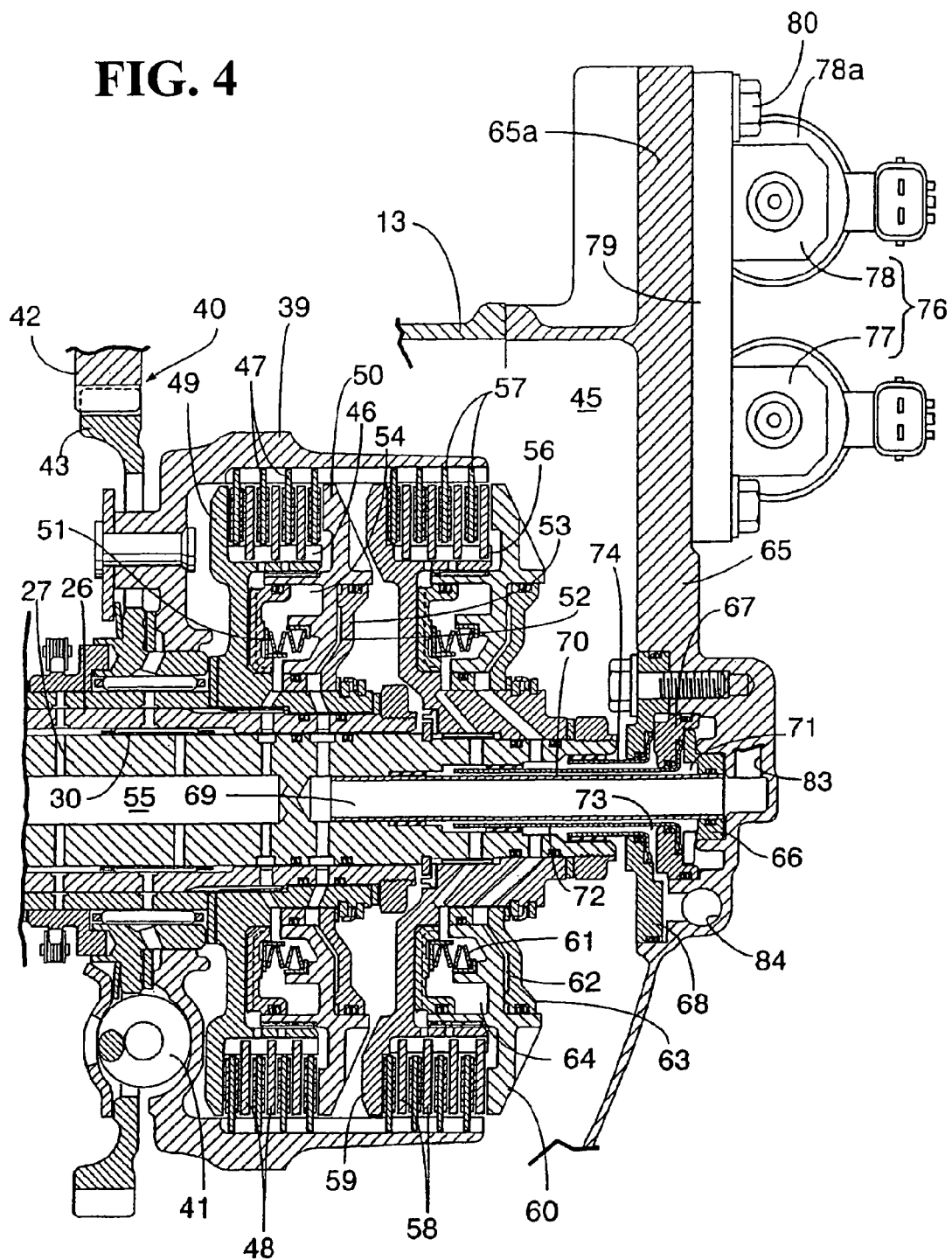
FIG. 4 is an enlarged view of an essential part shown in FIG. 3.

FIGS. 1 to 4 show a first preferred embodiment of the present invention. FIG. 1 is a partially cutaway, left side view of a power unit PA according to the first preferred embodiment. FIG. 2 is a right side view of the power unit PA. FIG. 3 is a cross section taken along the line 3-3 in FIG. 1. FIG. 4 is an enlarged view of an essential part shown in FIG. 3.

Referring now to FIGS. 1 and 2, the power unit PA is composed generally of an engine EA and a transmission TA for transmitting power from the engine EA as shifting. The power unit PA is adapted to be mounted on a vehicle such as a motorcycle. The engine EA has an engine body 11, which includes a crankcase 13 for rotatably supporting a crankshaft 12 extending in the lateral direction of the motorcycle. A cylinder block 14 is joined to the crankcase 13 and has a cylinder bore 17 in which a piston 18 connected through a connecting rod 19 to the crankshaft 12 is slidably fitted. A cylinder head 15 is joined to the cylinder block 14 so that a combustion chamber 20 to which the top of the piston 18 is exposed is formed between the cylinder block 14 and the cylinder head 15. A head cover 16 is joined to the cylinder head 15.

The crankcase 13 is composed of an upper case half 13a and a lower case half 13b that are joined to each other. The upper case half 13a is formed integrally with the cylinder block 14. The axis of the crankshaft 12 lies on the plane formed by a joint surface between the upper case half 13a and the lower case half 13b.

The axis C of the cylinder bore 17 is inclined frontward when the power unit PA is mounted on the motorcycle. An intake valve 21 and an exhaust valve 22 are operatively provided in the cylinder head 15. A valve train 23 for operating the intake valve 21 and the exhaust valve 22 is accommodated in the space defined between the cylinder head 15 and the head cover 16.

Referring next to FIG. 3, the transmission TA is composed of a gear shifting mechanism 25 and first and second clutches 37 and 38 provided between the gear shifting mechanism 25 and the crankshaft 12. The first and second clutches 37 and 38 function to switch between an engaged condition where the power from the crankshaft 12 is transmitted to the gear shifting mechanism 25 and a disengaged condition where the transmission of power from the crankshaft 12 to the gear shifting mechanism 25 is cut off according to the application or cancellation of hydraulic pressure. The first and second clutches 37 and 38 are located in a power transmission path for transmitting a rotational drive force of the crankshaft 12 to a drive wheel, i.e., a rear wheel (not shown) of the motorcycle.

The gear shifting mechanism 25 is accommodated in the crankcase 13 and includes a plurality of gear trains respectively corresponding to a plurality of shift positions, e.g., a first speed gear train G1, a second speed gear train G2, a third speed gear train G3, a fourth speed gear train G4, a fifth speed gear train G5, and a sixth speed gear train G6, which can be selectively established. More specifically, the second, fourth, and sixth speed gear trains G2, G4, and G6 are provided between a first main shaft 26 and a counter shaft 28 connected to the rear wheel. The first, third, and fifth speed gear trains G1, G3, and G5 are provided between a second main shaft 27 and the counter shaft 28. The second main shaft 27 coaxially extends through the first main shaft 26 so as to be rotatable relative thereto.

The crankcase 13 has a pair of side walls 13c and 13d opposed to each other with a given space in the lateral direction along the axis of the crankshaft 12. The first main shaft 26 is cylindrical and has an axis parallel to the axis of the crankshaft 12. The first main shaft 26 is rotatably inserted at its intermediate portion through the right side wall 13c of the crankcase 13 in such a manner that a ball bearing 29 is interposed between the right side wall 13c and the first main shaft 26. The second main shaft 27 has the same axis as that of the first main shaft 26, which is parallel to the axis of the crankshaft 12. The second main shaft 27 is inserted through the first main shaft 26 in such a manner that the axial position of the second main shaft 27 relative to the first main shaft 26 is fixed and that the first and second main shafts 26 and 27 are rotatable relative to each other. That is, a plurality of needle bearings 30 are interposed between the first main shaft 26 and the second main shaft 27. The second main shaft 27 is rotatably supported at a left end portion thereof through a ball bearing 31 to the left side wall 13d of the crankcase 13.

The counter shaft 28 has an axis parallel to the axis of the crankshaft 12. The counter shaft 28 is rotatably supported at a right end portion thereof through a ball bearing 32 to the right side wall 13c. The left end portion of the counter shaft 28 is rotatably inserted through the left side wall 13d in such a manner that a ball bearing 33 and an annular seal member 34 are interposed between the left side wall 13d and the counter shaft 28. A drive sprocket 35 is fixed to the projecting end portion of the counter shaft 28 projecting leftward from the left side wall 13d. A chain 36 for transmitting a drive force from the counter shaft 28 to the rear wheel is wrapped around the drive sprocket 35.

Referring also to FIG. 4, a clutch cover 65 is joined to a right side portion of the crankcase 13 as viewed in a forward running direction of the motorcycle. A clutch chamber 45 is defined between the crankcase 13 and the clutch cover 65. The first and second clutches 37 and 38 are accommodated in the clutch chamber 45.

The first clutch 37 is provided between the crankshaft 12 and the right end portion of the first main shaft 26. The second clutch 38 is provided between the crankshaft 12 and the right end portion of the second main shaft 27. The drive force from the crankshaft 12 is input through a primary speed reduction device 40 and a damper spring 41 to a common outer member 39 of the first and second clutches 37 and 38. The primary speed reduction device 40 is composed of a drive gear 42 provided on the crankshaft 12 and a driven gear 43 relatively rotatably supported to the first main shaft 26 and meshing with the drive gear 42. The driven gear 43 is connected through the damper spring 41 to the outer member 39.

The first clutch 37 includes the outer member 39. A first inner member 46 is coaxially surrounded by the outer member 39 and is relatively nonrotatably connected to the first main shaft 26. A plurality of first friction plates 47 is relatively nonrotatably engaged with the outer member 39. A plurality of second friction plates 48 is relatively nonrotatably engaged with the first inner member 46 and is arranged in alternate relationship with the first friction plates 47. A first pressure receiving plate 49 is formed integrally with the first inner member 46 so as to be opposed to the stack of the first and second friction plates 47 and 48. A first piston 50 is located axially opposite to the first pressure receiving plate 49 in such a manner that the stack of the first and second friction plates 47 and 48 is interposed between the first piston 50 and the first pressure receiving plate 49. A first spring 51 biases the first piston 50.

A first end wall member 53 is fixedly mounted on the first inner member 46 in such a manner that a first oil pressure chamber 52 is defined between the back surface of the first piston 50 and the first end wall member 53. With an increase in oil pressure in the first oil pressure chamber 52, the first piston 50 is moved to apply pressure to the stack of the first and second friction plates 47 and 48 against the first pressure receiving plate 49, thereby obtaining the engaged condition where the power from the crankshaft 12 is transmitted through the outer member 39, the first and second friction plates 47 and 48, and the first inner member 46 to the first main shaft 26. On the other hand, a first canceler chamber 54 is defined between the first inner member 46 and the front surface of the first piston 50. The first spring 51 is accommodated in the first canceler chamber 54 so as to bias the first piston 50 in such a direction that the volume of the first oil pressure chamber 52 is decreased.

The first canceler chamber 54 is in communication with a first oil line 55 formed in the second main shaft 27 so as to extend coaxially therewith. The first oil line 55 functions to supply a lubricating oil to various portions of the gear shifting mechanism 25 and to between the first and second main shafts 26 and 27. Even when a centrifugal force due to rotation is applied to the oil in the first oil pressure chamber 52 in its pressure reduced condition to move the first piston 50, a centrifugal force is similarly applied to the oil in the first canceler chamber 54 to resist the movement of the first piston 50, so that such undesired movement of the first piston 50 in the pressure applying direction to the stack of the first and second friction plates 47 and 48 can be avoided by the first canceler chamber 54.

The second clutch 38 is arranged axially adjacent to the first clutch 37 in the axial direction of the second main shaft 27 in such a manner that the first clutch 37 is interposed between the second clutch 38 and the primary speed reduction device 40. Similar to the first clutch 37, the second clutch 38 includes the outer member 39, a second inner member 56 coaxially surrounded by the outer member 39 and relatively nonrotatably connected to the second main shaft 27. A plurality of third friction plates 57 is relatively nonrotatably engaged with the outer member 39. A plurality of fourth friction plates 58 is relatively nonrotatably engaged with the second inner member 56 and is arranged in alternate relationship with the third friction plates 57. A second pressure receiving plate 59 is formed integrally with the second inner member 56 so as to be opposed to the stack of the third and fourth friction plates 57 and 58. A second piston 60 is located axially opposite to the second pressure receiving plate 59 in such a manner that the stack of the third and fourth friction plates 57 and 58 is interposed between the second piston 60 and the second pressure receiving plate 59. A second spring 61 biases the second piston 60.

A second end wall member 63 is fixedly mounted on the second inner member 56 in such a manner that a second oil pressure chamber 62 is defined between the back surface of the second piston 60 and the second end wall member 63. With an increase in oil pressure in the second oil pressure chamber 62, the second piston 60 is moved to apply pressure to the stack of the third and fourth friction plates 57 and 58 against the second pressure receiving plate 59, thereby obtaining the engaged condition where the power from the crankshaft 12 is transmitted through the outer member 39, to the second main shaft 27. On the other hand, a second canceler chamber 64 is defined between the second inner member 56 and the front surface of the second piston 60. The second spring 61 is accommodated in the second canceler chamber 64 so as to bias the second piston 60 in such a direction that the volume of the second oil pressure chamber 62 is decreased.

The second canceler chamber 64 is in communication with a second oil line 71 to be hereinafter described. Even when a centrifugal force due to rotation is applied to the oil in the second oil pressure chamber 62 in its pressure reduced condition to move the second piston 60, a centrifugal force is similarly applied to the oil in the second canceler chamber 64 to resist the movement of the second piston 60, so that such undesired movement of the second piston 60 in the pressure applying direction to the stack of the third and fourth friction plates 57 and 58 can be avoided by the second canceler chamber 64.

First, second, and third partition members 66, 67, and 68 are mounted on the inside surface of the clutch cover 65 covering the first and second clutches 37 and 38. The first, second, and third partition members 66, 67, and 68 are arranged in this order from the right side as viewed in the forward running direction of the motorcycle. A first cylindrical member 70 for forming a first oil passage 69 in communication with the first oil pressure chamber 52 of the first clutch 37 is provided between the second main shaft 27 and the first partition member 66. A second cylindrical member 72 is provided between the second main shaft 27 and the second partition member 67 so as to coaxially surround the first cylindrical member 70 in such a manner that an annular second oil line 71 in communication with the second canceler chamber 64 of the second clutch 38 is formed between the first cylindrical member 70 and the second cylindrical member 72. A third cylindrical member 74 is provided between the second main shaft 27 and the third partition member 68 so as to coaxially surround the second cylindrical member 72 in such a manner that an annular second oil passage 73 communicating with the second oil pressure chamber 62 of the second clutch 38 is formed between the second cylindrical member 72 and the third cylindrical member 73.

The first and second oil passages 69 and 73 are connected to a clutch actuator 76, so that the oil pressures in the first and second oil passages 69 and 73, or in the first and second oil pressure chambers 52 and 62 are controlled by the clutch actuator 76 to thereby control the switching between the engaged condition and the disengaged condition of each of the first and second clutches 37 and 38.

The clutch actuator 76 is composed of a first electromagnetic control valve 77 for switching between the application and cancellation of the oil pressure to the first oil pressure chamber 52 of the first clutch 37 and a second electromagnetic control valve 78 for switching between the application and cancellation of the oil pressure to the second oil pressure chamber 62 of the second clutch 38. The clutch cover 65 is integrally formed with a mounting plate portion 65a extending upward from an upper portion of the clutch cover 65. A supporting plate 79 for commonly supporting the first and second electromagnetic control valves 77 and 78 is fixedly mounted on the mounting plate portion 65a of the clutch cover 65 by means of a plurality of bolts 80.

The clutch actuator 76 is mounted on the upper portion of the clutch cover 65 in such a manner that at least a part of the clutch actuator 76 overlaps the cylinder block 14 as viewed in side elevation of the vehicle. More specifically, as shown in FIG. 2, the first and second electromagnetic control valves 77 and 78 are mounted on the upper portion of the clutch cover 65 in such a manner that a part of solenoid portions 77a and 78a, respectively constituting the first and second electromagnetic control valves 77 and 78, overlaps the cylinder block 14 as viewed in side elevation of the motorcycle.

As shown in FIG. 2, an oil pump 81 adapted to be operated by the power transmitted from the crankshaft 12 is accommodated in the crankcase 13 at a position below the gear shifting mechanism 25. A third oil passage 82 for supplying the oil discharged from the oil pump 81 to the first and second electromagnetic control valves 77 and 78 is formed in the clutch cover 65. The clutch cover 65 is further formed with an oil passage constituting at least a part of a hydraulic path for connecting the first and second clutches 37 and 38 to the clutch actuator 76. More specifically, the clutch cover 65 is formed with a fourth oil passage 83 for connecting the first oil passage 69 communicating with the first oil pressure chamber 52 of the first clutch 37 to the first electromagnetic control valve 77 and is also formed with a fifth oil passage 84 for connecting the second oil passage 73 communicating with the second oil pressure chamber 62 of the second clutch 38 to the second electromagnetic control valve 78.

As shown in FIG. 3, the fourth speed gear train G4, the sixth speed gear train G6, and the second speed gear train G2 are juxtaposed in this order from the opposite side of the first and second clutches 37 and 38 so as to be provided between the first main shaft 26 and the counter shaft 28. The second speed gear train G2 is composed of a second speed drive gear 87 formed integrally with the first main shaft 26 and a second speed driven gear 88 relatively rotatably supported to the counter shaft 28 and meshing with the second speed drive gear 87. The sixth speed gear train G6 is composed of a sixth speed drive gear 89 relatively rotatably supported to the first main shaft 26 and a sixth speed driven gear 90 axially slidably and relatively nonrotatably supported to the counter shaft 28 and meshing with the sixth speed drive gear 89. The fourth speed gear train G4 is composed of a fourth speed drive gear 91 axially slidably and relatively nonrotatably supported to the first main shaft 26 and a fourth speed driven gear 92 relatively rotatably supported to the counter shaft 28 and meshing with the fourth speed drive gear 91.

A first shifter 93 is axially slidably and relatively nonrotatably supported to the counter shaft 28 between the second speed driven gear 88 and the fourth speed driven gear 92 in such a manner as to switch among a condition where the first shifter 93 is engaged with the second speed driven gear 88, a condition where the first shifter 93 is engaged with the fourth speed driven gear 92, and a neutral condition where the first shifter 93 is engaged with neither the second gear driven gear 88 nor the fourth speed driven gear 92. The first shifter 93 is integrally formed with the sixth speed driven gear 90. Furthermore, a second shifter 94 is axially slidably and relatively nonrotatably supported to the first main shaft 26. The second shifter 94 is integrally formed with the fourth speed drive gear 91. The second shifter 94 is movable in the axial direction of the first main shaft 26 so as to switch between a condition where the second shifter 94 is engaged with the sixth speed drive gear 89 and a condition where the second shifter 94 is disengaged from the sixth speed drive gear 89.

When the first shifter 93 is brought into engagement with the second speed driven gear 88 in the condition where the second shifter 94 is disengaged from the sixth speed drive gear 89, the second speed gear train G2 is established. When the first shifter 93 is brought into engagement with the fourth speed driven gear 92 in the condition where the second shifter 94 is disengaged from the sixth speed drive gear 89, the fourth speed gear train G4 is established. When the second shifter 94 is brought into engagement with the sixth speed drive gear 89 in the neutral condition of the first shifter 93, the sixth speed gear train G6 is established.

The first speed gear train G1, the fifth speed gear train G5, and the third speed gear train G3 are juxtaposed in this order from the opposite side of the first and second clutches 37 and 38 in FIG. 3 so as to be provided between the counter shaft 28 and a left portion of the second main shaft 27 projecting leftward from the left end of the first main shaft 26. The third speed gear train G3 is composed of a third speed drive gear 95 axially slidably and relatively nonrotatably supported to the second main shaft 27 and a third speed driven gear 96 relatively rotatably supported to the counter shaft 28 and meshing with the third speed drive gear 95. The fifth speed gear train G5 is composed of a fifth speed drive gear 97 relatively rotatably supported to the second main shaft 27 and a fifth speed driven gear 98 axially slidably and relatively nonrotatably supported to the counter shaft 28 and meshing with the fifth speed drive gear 97. The first speed gear train G1 is composed of a first speed drive gear 99 formed integrally with the second main shaft 27 and a first speed driven gear 100 relatively rotatably supported to the counter shaft 28 and meshing with the first speed drive gear 99.

A third shifter 101 is axially slidably and relatively nonrotatably supported to the second main shaft 27. The third shifter 101 is integrally formed with the third speed drive gear 95. The third shifter 101 is movable in the axial direction of the second main shaft 27 so as to switch between a condition where the third shifter 101 is engaged with the fifth speed drive gear 97 and a condition where the third shifter 101 is disengaged from the fifth speed drive gear 97. A fourth shifter 102 is axially slidably and relatively nonrotatably supported to the counter shaft 28 between the third speed driven gear 96 and the first speed driven gear 100 so as to switch among a condition where the fourth shifter 102 is engaged with the third speed driven gear 96, a condition where the fourth shifter 102 is engaged with the first speed driven gear 100, and a neutral condition where the fourth shifter 102 is engaged with neither the third speed driven gear 96 nor the first speed driven gear 100. The fourth shifter 102 is integrally formed with the fifth speed driven gear 98.

When the fourth shifter 102 is brought into engagement with the first speed driven gear 100 in the condition where the third shifter 101 is disengaged from the fifth speed drive gear 97, the first speed gear train G1 is established. When the fourth shifter 102 is brought into engagement with the third speed driven gear 96 in the condition where the third shifter 101 is disengaged from the fifth speed drive gear 97, the third speed gear train G3 is established. When the third shifter 101 is brought into engagement with the fifth speed drive gear 97 in the neutral condition of the fourth shifter 102, the fifth speed gear train G5 is established.

The first, second, third, and fourth shifters 93, 94, 101, and 102 are rotatably retained to first, second, third, and fourth shift forks 103, 104, 105, and 106, respectively. The first, second, third, and fourth shift forks 103, 104, 105, and 106 are selectively driven in the axial direction of the first and second main shafts 26 and 27 and the counter shaft 28, thereby axially moving the first, second, third, and fourth shifters 93, 94, 101, and 102.

The first to fourth shift forks 103 to 106 are engaged with the outer circumference of a shift drum 107 (see FIG. 1) rotatably supported to the crankcase 13 and having an axis parallel to the axis of the crankshaft 12. By rotating the shift drum 107, the first to fourth shift forks 103 to 106 are selectively slid.

The shift drum 107 is rotatably driven by a shift actuator 108 having an electric motor 109. The shift actuator 108 is mounted on the crankcase 13 on the left side opposite to the clutch cover 65.

The operation of the first preferred embodiment mentioned above will now be described. The first and second clutches 37 and 38 are accommodated in the clutch chamber 45 formed between the crankcase 13 and the clutch cover 65 joined to the right side portion of the crankcase 13 as viewed in the forward running direction of the motorcycle. Furthermore, the clutch actuator 76 for controlling the switching between the engaged condition and disengaged condition of the first and second clutches 37 and 38 is provided on the upper portion of the clutch cover 65.

Accordingly, the clutch actuator 76 can be located by effectively utilizing the space above the clutch cover 65 to avoid an increase in the longitudinal size of the engine body 11 and the vehicle body. Furthermore, the distance between the first and second clutches 37 and 38 and the clutch actuator 76 is short, so that the path for transmitting a control force from the clutch actuator 76 to the first and second clutches 37 and 38 can be made compact. Furthermore, the clutch actuator 76 can readily receive running wind during running of the vehicle, so that the cooling effect for the clutch actuator 76 can be improved.

Furthermore, the clutch cover 65 is formed with an oil passage constituting at least a part of a hydraulic path for connecting the first and second clutches 37 and 38 for switching between the connection and disconnection of the transmission of power according to the application or cancellation of hydraulic pressure to the clutch actuator 76 for controlling the oil pressures applied to the first and second clutches 37 and 38. More specifically, the clutch cover 65 is formed with the fourth oil passage 83 for connecting the first oil passage 69 in communication with the first oil pressure chamber 52 of the first clutch 37 to the first electromagnetic control valve 77 and is also formed with the fifth oil passage 84 for connecting the second oil passage 73 n communication with the second oil pressure chamber 62 of the second clutch 38 to the second electromagnetic control valve 78. Accordingly, a mechanism for operating the first and second clutches 37 and 38 can be configured compactly in the vicinity of the clutch cover 65, and the maintainability of this mechanism can be improved owing to such a compact configuration.

Furthermore, the clutch actuator 76 is located in such a manner that at least a part of the clutch actuator 76 overlaps the cylinder block 14 as viewed in side elevation of the vehicle. Accordingly, the clutch actuator 76 can more readily receive running wind, so that the cooling effect for the clutch actuator 76 can be further improved.

Figure 5:
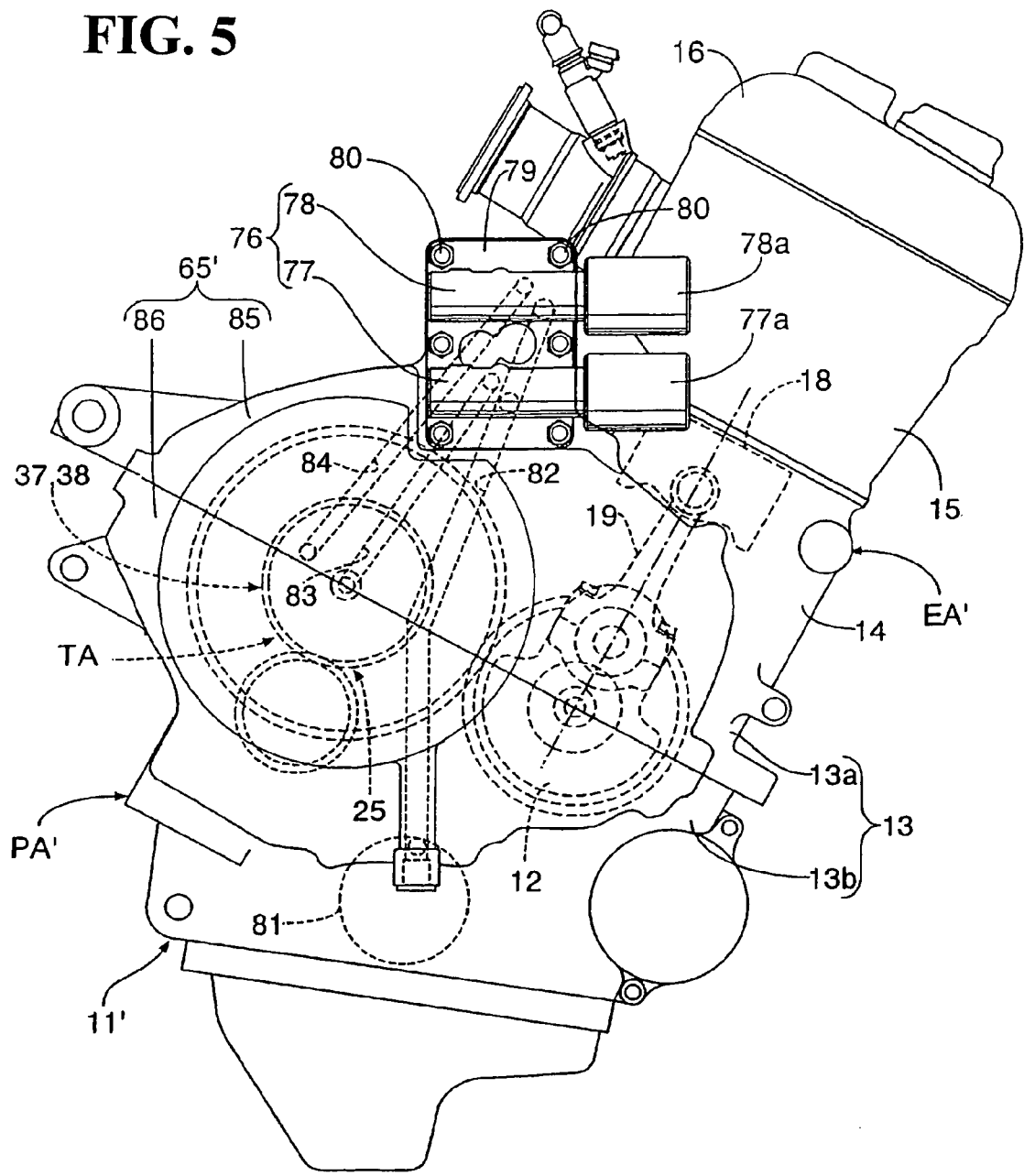
FIG. 5 is a view similar to FIG. 2, showing a modification of the first preferred embodiment.

FIG. 5 shows a modification of the first preferred embodiment, wherein substantially the same parts as those of the first preferred embodiment are denoted by the same reference numerals, and the detailed description thereof will be omitted herein.

The power unit PA' is composed generally of an engine EA' and a transmission TA for transmitting power from the engine EA' as shifting. A clutch cover 65' constitutes a part of an engine body 11' of the engine EA' and is joined to a crankcase 13. The clutch cover 65' is composed of an upper cover half 85 integral with the upper case half 13a of the crankcase 13 and a lower cover half 86 integral with the lower case half 13b of the crankcase 13. The upper case half 13a and the lower case half 13b are joined to each other to thereby form the crankcase 13, thus forming the clutch cover 65'. A clutch actuator 76 is mounted on an upper portion of the clutch cover 65', i.e., an upper portion of the upper cover half 85.

According to this modification, the clutch cover 65' is formed by a part of the crankcase 13, so that any members for constituting the clutch cover 65' are not necessary. Therefore, the number of parts can be reduced.

Figure 6:
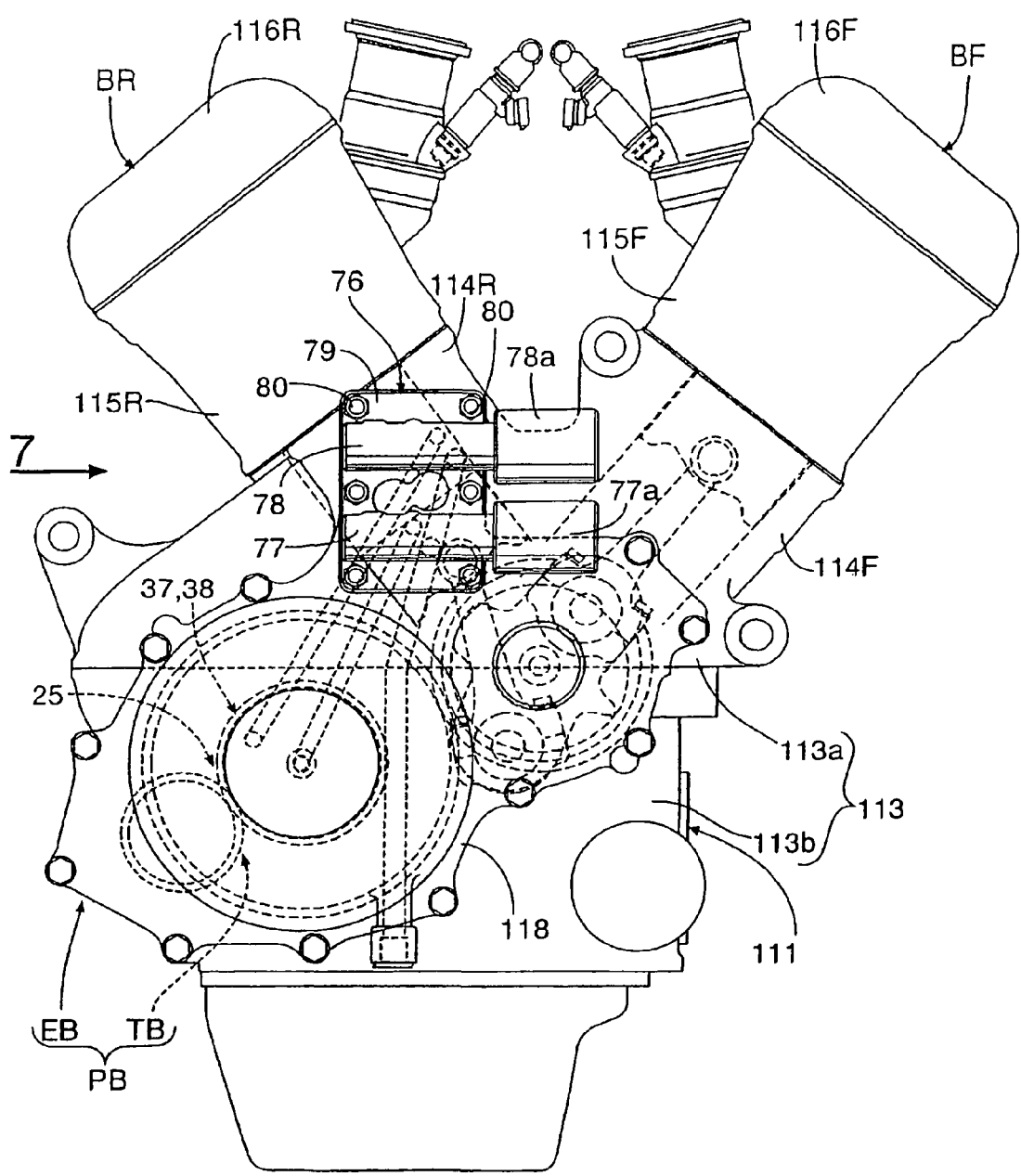
FIG. 6 is a right side view of a power unit according to a second preferred embodiment of the present invention.

FIGS. 6 and 7 show a second preferred embodiment of the present invention. FIG. 6 is a right side view of a power unit PB according to the second preferred embodiment. FIG. 7 is a view taken in the direction shown by an arrow 7 in FIG. 6. In FIGS. 6 and 7, substantially the same parts as those of the first preferred embodiment are denoted by the same reference numerals, and the detailed description thereof will be omitted herein.

Referring now to FIG. 6, the power unit PB is composed generally of an engine EB and a transmission TB for transmitting power from the engine EB as shifting. The power unit PB is adapted to be mounted on a vehicle such as a motorcycle. The engine EB has a V-shaped engine body 111 including a front bank BF located at a front position in the condition that the engine EB is mounted on the motorcycle and a rear bank BR located on the rear side of the front bank BF. A crankshaft 112 extending in the lateral direction of the motorcycle is rotatably supported to a crankcase 113 common to the front and rear banks BF and BR.

The crankcase 113 is composed of an upper case half 113a and a lower case half 113b joined to each other. Front and rear cylinder blocks 114F and 114R are integrally formed to have a V-shaped configuration and joined to the crankcase 113. The front bank BF is composed of the front cylinder block 114F, a front cylinder head 115F joined to the front cylinder block 114F, and a front head cover 116F joined to the front cylinder head 115F. Similarly, the rear bank BR is composed of the rear cylinder block 114R, a rear cylinder head 115R joined to the rear cylinder block 114R, and a rear head cover 116R joined to the rear cylinder head 115R.

The transmission TB is similar to the transmission TA in the first preferred embodiment. That is, first and second clutches 37 and 38 for switching between an engaged condition and a disengaged condition according to the application or cancellation of hydraulic pressure are located in a power transmission path for transmitting a rotational drive force of the crankshaft 112 to a drive wheel, i.e., a rear wheel (not shown) of the motorcycle. Furthermore, a clutch cover 118 is joined to a right side portion of the crankcase 113 as viewed in the forward running direction of the motorcycle. A clutch actuator 76 for controlling the switching between the engaged condition and disengaged condition of the first and second clutches 37 and 38 is mounted on an upper portion of the clutch cover 118 by means of a plurality of bolts 80.

As shown in FIG. 7, the outer surface of the upper portion of the clutch cover 118 has a flat mounting seat 118a for mounting the supporting plate 79 for the clutch actuator 76 by using the bolts 80. The flat mounting seat 118a is inclined laterally inward to the upper side. Accordingly, the clutch actuator 76 mounted on the upper portion of the clutch cover 118 is inclined laterally inward to the upper side along the upper portion of the clutch cover 118. Furthermore, the clutch actuator 76 is positioned inside of the laterally outermost end of the clutch cover 118.

Furthermore, the clutch actuator 76 is located in such a manner that at least a part of the clutch actuator 76 overlaps the front and rear cylinder blocks 114F and 114R as viewed in side elevation of the vehicle.

According to the second preferred embodiment, the clutch actuator 76 can be located by effectively utilizing the space above the clutch cover 118 to avoid an increase in the longitudinal size of the engine body 111 and the vehicle body. Furthermore, the path for transmitting a control force from the clutch actuator 76 to the first and second clutches 37 and 38 can be made compact. Furthermore, the clutch actuator 76 can readily receive running wind during running of the vehicle, so that the cooling effect for the clutch actuator 76 can be improved.

Furthermore, a mechanism for operating the first and second clutches 37 and 38 can be configured compactly in the vicinity of the clutch cover 118, and the maintainability of this mechanism can be improved owing to such a compact configuration. Furthermore, at least a part of the clutch actuator 76 overlaps the front and rear cylinder blocks 114F and 114R as viewed in side elevation of the vehicle. Accordingly, the clutch actuator 76 can more readily receive running wind, so that the cooling effect for the clutch actuator 76 can be further improved.

Furthermore, the clutch actuator 76 is positioned inside of the laterally outermost end of the clutch cover 118. Accordingly, the projection of the clutch actuator 76 from the engine body 111 in the lateral direction can be avoided to thereby prevent an increase in the lateral size of the engine EB. Furthermore, the clutch actuator 76 is inclined laterally inward along the upper portion of the clutch cover 118. Accordingly, the projection of the clutch actuator 76 from the clutch cover 118 can be suppressed to thereby contribute to a reduction in overall size of the engine EB.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power unit of a vehicle, comprising:
a crankcase;
a crankshaft rotatably supported in said crankcase and having an axis along a first direction;
a piston connected to the crankshaft via a connecting rod;
a power transmission path for transmitting a rotational drive force of said crankshaft to a drive wheel;
a clutch provided in said power transmission path for switching transmission of power between a connected and a disconnected state;
a clutch cover joined to a side portion of said crankcase;
a clutch chamber formed between said crankcase and said clutch cover for accommodating said clutch;
an engine body including said crankcase and said clutch cover, wherein the engine body has a front side, a rear side, and a lateral side extending perpendicularly to the first direction and joining the front side and the rear side of the engine body; and
a clutch actuator mounted on said engine body and configured to control the switching between an engaged condition and disengaged condition of said clutch,
wherein said clutch actuator is provided on an upper portion of said clutch cover and on the lateral side of the engine body,
wherein solenoid portions of the clutch actuator are arranged at a front portion of the clutch actuator,
wherein said clutch actuator is positioned between the crankcase and a laterally outermost end of said clutch cover,
wherein said clutch actuator includes a pair of control valves which are arranged one above the other along a lateral side of the power unit,
wherein an outer surface of the upper portion of said clutch cover has a mounting seat for mounting said clutch actuator, said mounting seat being inclined laterally inward to an upper side, so that the clutch actuator is inclined laterally inward to the upper side along the upper portion of said clutch cover,
wherein said clutch actuator mounted on the upper portion of said clutch cover controls oil pressure applied to said clutch for switching the transmission of power between the connected and disconnected states according to application and cancellation of hydraulic pressure, and an oil passage penetrating through said clutch cover constitutes at least a part of a hydraulic path for connecting said clutch actuator and said clutch,
wherein an oil pump configured to be operated by the power transmitted from the crankshaft is accommodated in the crankcase at a position below a gear shifting mechanism, and
wherein a second oil passage for supplying the oil discharged from the oil pump to the pair of control valves is formed in the clutch cover.

2. The power unit of the vehicle according to claim 1, wherein said engine body further includes a cylinder block joined to said crankcase, and said clutch actuator is located so that at least a part of said clutch actuator overlaps said cylinder block as viewed in side elevation of said vehicle.

3. The power unit of the vehicle according to claim 1, wherein said crankcase is composed of an upper case half and a lower case half, and said clutch cover is composed of an upper cover and a lower cover half,
said upper case half of the crankcase and the upper cover half of said clutch cover being formed integrally as a single part, and said lower case half of the crankcase and said lower cover half of the clutch cover being formed integrally as another single part,
the two single parts being joined to each other to form said crankcase and said clutch cover.

4. A power unit of a vehicle, comprising:
a crankcase;
a crankshaft rotatably supported in said crankcase and having an axis along a first direction;
a clutch cover joined to a side portion of said crankcase;
a clutch chamber formed between said crankcase and said clutch cover;
a clutch provided in said clutch chamber; and
a clutch actuator mounted on an upper portion of said clutch cover and configured to control the switching between an engaged condition and disengaged condition of said clutch, wherein solenoid portions of the clutch actuator are arranged at a front portion of the clutch actuator,
wherein said clutch actuator is positioned between the crankcase and a laterally outermost end of said clutch cover, wherein the power unit has a front side, a rear side, and a lateral side, extending perpendicularly to the first direction wherein said clutch actuator includes a first control valve and a second control valve arranged above the first control valve, and the first valve and the second valve are arranged along the lateral side of the power unit, and wherein an outer surface of the upper portion of said clutch cover has a mounting seat for mounting said clutch actuator, said mounting seat being inclined laterally inward to an upper side, so that the clutch actuator is inclined laterally inward to the upper side along the upper portion of said clutch cover, wherein said clutch actuator mounted on the upper portion of said clutch cover controls oil pressure applied to said clutch for switching the transmission of power between the connected and disconnected states according to application and cancellation of hydraulic pressure, and an oil passage penetrating through said clutch cover constitutes at least a part of a hydraulic path for connecting said clutch actuator and said clutch, wherein the oil passage formed in said clutch cover extends upwardly through the clutch cover from the clutch to the clutch actuator, wherein an oil pump configured to be operated by the power transmitted from the crankshaft is accommodated in the crankcase at a position below a gear shifting mechanism, and wherein a second oil passage for supplying the oil discharged from the oil pump to the pair of control valves is formed in the clutch cover.

5. The power unit of the vehicle according to claim 4, further comprising a cylinder block joined to said crankcase, and said clutch actuator is located so that at least a part of said clutch actuator overlaps said cylinder block as viewed in side elevation of said vehicle.

6. The power unit of the vehicle according to claim 4, wherein said crankcase is composed of an upper case half and a lower case half, and said clutch cover is composed of an upper cover and a lower cover half, said upper case half of the crankcase and the upper cover half of said clutch cover being formed integrally as a single part, and said lower case half of the crankcase and said lower cover half of the clutch cover being formed integrally as another single part, the two single parts being joined to each other to form said crankcase and said clutch cover.

7. The power unit of the vehicle according to claim 1, wherein the oil passage formed in said clutch cover extends upwardly through the clutch cover from the clutch to the clutch actuator.

8. The power unit of the vehicle according to claim 4, further comprising:

a piston connected to the crankshaft via a connecting rod.

9. The power unit of the vehicle according to claim 1, wherein the clutch cover is integrally formed with a mounting plate extending upward from an upper portion of the clutch cover and extending above a top of a cylinder block that is joined to the crankcase, and the clutch actuator is mounted directly on the mounting plate that is located above the top of the cylinder block.

10. The power unit of the vehicle according to claim 4, wherein the clutch cover is integrally formed with a mounting plate extending upward from an upper portion of the clutch cover and extending above a top of a cylinder block that is joined to the crankcase, and the clutch actuator is mounted directly on the mounting plate that is located above the top of the cylinder block.

11. The power unit of the vehicle according to claim 1, wherein a supporting plate commonly supports the pair of control valves, and each of pair of the control valves is an electromagnetic valve.

12. The power unit of the vehicle according to claim 4, wherein a supporting plate commonly supports both the first control valve and the second control valve, and the first control valve and the second control valve are electromagnetic valves.

* * * * *